United States Patent
Harter et al.

[11] Patent Number: 5,847,365
[45] Date of Patent: Dec. 8, 1998

[54] INSTANT-ON COOKING DEVICE CONTROLLER

[75] Inventors: Dave Harter; Douglas S. Jones, both of New Port Richey; Robert J. Wenzel, Tarpon Springs, all of Fla.

[73] Assignee: Garland Commercial Industries, Inc., Freeland, Pa.

[21] Appl. No.: 862,931

[22] Filed: May 29, 1997

Related U.S. Application Data

[60] Provisional application No. 60/019,330, Jun. 6, 1996 and provisional application No. 60/038,794, Feb. 21, 1997.

[51] Int. Cl.$^6$ .................................................... H05B 1/02
[52] U.S. Cl. ........................ 219/492; 219/448; 219/442; 219/501; 99/330; 99/325
[58] Field of Search ...................................... 219/492, 442, 219/497, 448, 501, 505, 508, 242, 243; 323/319, 235; 99/325, 327, 332, 330

[56] References Cited

U.S. PATENT DOCUMENTS

| | | |
|---|---|---|
| Re. 32,994 | 7/1989 | Adamson et al. . |
| 4,165,682 | 8/1979 | Weiss . |
| 4,483,239 | 11/1984 | Mueller et al. . |
| 4,567,819 | 2/1986 | Adamson . |
| 4,586,428 | 5/1986 | Adamson . |
| 4,601,237 | 7/1986 | Harter et al. . |
| 4,669,373 | 6/1987 | Weimer et al. . |
| 4,697,504 | 10/1987 | Keating . |
| 4,700,619 | 10/1987 | Scanlon . |
| 4,763,571 | 8/1988 | Bergling et al. . |
| 4,987,827 | 1/1991 | Marquez . |
| 4,989,580 | 2/1991 | Dunham . |
| 5,070,775 | 12/1991 | Blake . |
| 5,197,377 | 3/1993 | Jennings et al. . |
| 5,293,028 | 3/1994 | Payne ...................................... 219/486 |
| 5,341,727 | 8/1994 | Dickson . |
| 5,451,288 | 9/1995 | Smith et al. ............................. 156/359 |
| 5,531,155 | 7/1996 | Pellicane et al. . |
| 5,582,755 | 12/1996 | Maher, Jr. et al. ...................... 219/242 |
| 5,597,499 | 1/1997 | Dunn ...................................... 219/243 |

FOREIGN PATENT DOCUMENTS

| | | |
|---|---|---|
| 2 575 913 | 7/1986 | France . |
| 2 588 062 | 4/1987 | France . |
| 2 638 627 | 5/1990 | France . |
| 87/03186 | 6/1987 | WIPO . |

*Primary Examiner*—Mark H. Paschall
*Attorney, Agent, or Firm*—Ohlandt, Greeley, Ruggiero & Perle

[57] ABSTRACT

A unique instant-on feature for a cooking device that allows microprocessor control of the device after a period of idling. When activated, the instant-on enabler switch sends a signal to the microprocessor, which checks an internal clock to determine the amount of time the device has remained idle since the last cook cycle. This information is sent back to the instant-on enabler switch, which then selects among an appropriate array of cooking times. These times, longer than the initial pre-set cooking time, are based on testing and compensate for the degree of heat zone stratification in the cooking medium or surface caused by the extended idling. The instant-on enabler program immediately supplies additional heat to the cooking surface upon activation cooking cycle or operator input, allowing the maximum time for the cooking surface to reach proper cooking temperature.

19 Claims, 4 Drawing Sheets

INSTANT-ON COOKING DEVICE CONTROLLER

This application is related to co-pending U.S. patent application Ser. No. 08/862,932 pending, filed on an even date with the present application. Both applications claim priority from U.S. Provisional patent application Ser. No. 60/019,330, filed Jun. 6, 1996. This application also claims priority from U.S. Provisional application Ser. No. 60/038,794, filed Feb. 21, 1997.

The present invention relates to an improved controller for cooking devices, and more particularly to a controller having an instant-on feature to provide appropriate cooking temperatures in automated cooking devices such as grills and fryers.

BACKGROUND OF THE INVENTION

A wide variety of automated cooking devices are presently employed in restaurants. This is particularly true for fast food type restaurants, where the menu is standardized, and the cooking devices used are preprogrammed with appropriate cooking cycles for pre-set menu items, thus minimizing the amount of cooking time necessary, and the amount of operator involvement required in the cooking process. Grills and fryers are standard cooking equipment in such restaurants. In addition, clam shell grills, made with upper and lower cooking platens for cooking both sides of food products such as hamburger patties simultaneously, are also in use in fast-food restaurants. Clam shell cooking grills further reduce the overall cooking time and the amount of operator attention required for cooking the hamburger patties.

The advent of preprogrammed cooking devices employing preprogrammed cook cycles for a variety of menu items has led to considerable savings for the restaurant industry, in the form of lowered operator training costs, less waste due to more consistent cooked product, smaller operator time investment in each batch cooked—allowing one operator to handle larger numbers of tasks—and other similar factors. Nonetheless, these preprogrammed cooking devices have certain limitations.

Cooking devices such as grills and fryers revert to an idling mode between uses. The cooking device will maintain the cooking surface or medium at a pre-set temperature contained in its preprogrammed instructions. This temperature is set during trial runs of multiple, closely spaced cooking cycles. This is essential because, during the peak volume periods for which these high volume machines are designed, the temperature must be maintained so that the product is neither over- nor undercooked.

When the foregoing cooking devices are left idling for longer periods of time, when order volume is lower, a unique problem arises. The device will maintain itself at the pre-set temperature in its programming, as discussed above. However, the griddle plate of the grill, or the cooking oil of the fryer, for example, will eventually stratify into various temperature gradients. Only the minimum amount of heat necessary to keep the surface or medium nearest the sensors at the proper temperature will be applied by the device's controller.

When frozen hamburgers are eventually placed on the griddle, or frozen french fries are dropped into oil, the temperature rapidly drops to well below the desired, pre-set temperature setting. In many cases, due to the rapid cooking cycles involved, one or more full cooking cycles will be completed before the grill or oil has returned to the original conditions for which the device was programmed. This produces batches of undercooked or uncooked foods that must be cooked further under operator control, or as is more likely, thrown out. If the undercooked batches are inadvertently served, customers will be dissatisfied with the product. More significantly, if the customers eat the product, they may contract food-borne illnesses that are otherwise destroyed by proper cooking. This costly and potentially dangerous temperature control problem is inherent in the present temperature control technology. The problem is exacerbated when clam shell grills are used, because they already depend on a shorter cooking cycle, so the effect of any temperature irregularities is magnified.

The present invention seeks to overcome these limitations by providing a unique cooking device controller having a unique instant-on feature to minimize or eliminate the undercooking caused by heat zone stratification after the cooking device has idled over an extended period of time.

SUMMARY OF THE INVENTION.

The present invention provides a unique instant-on feature that allows microprocessor control of the idling device. When programmed, the instant-on enabler switch sends a signal to the microprocessor, which checks an internal clock to determine the amount of time the device has remained idle since the last cook cycle. This information is sent back to the instant-on enabler switch, which then selects among an appropriate array of cooking times. These times, progressively longer than the initial pre-set cooking time, are based on testing and compensate for the degree of stratification caused by the extended idling.

An additional feature of the instant-on enabler program is that it immediately supplies additional heat to the cooking surface upon activation by platen movement or operator input. This allows the maximum time for the cooking surface to reach proper cooking temperature before the cook cycle is initiated, thus minimizing cook cycle time. In contrast, traditional controllers adjust cooking surface temperature only after the food products have been loaded and the cook cycle activated.

Thus it is an object of this invention to provide a cooking device controller to compensate for the stratification of temperature in the cooking surface or medium over extended periods of idling.

It is a further object of this invention to provide a cooking device controller that minimizes undercooked food product output.

It is a further object of this invention to provide a cooking device controller that corrects the temperature of the cooking surface at the first sign of use after a period of idling.

Other and further objects, advantages and features of the present invention will be understood by reference to the following specification in conjunction with the annexed drawings.

DESCRIPTION OF THE PREFERRED EMBODIMENTS

The present invention discloses a unique controller for a cooking apparatus such as a flat grill, a clam shell grill, or a deep fryer. Particularly in fast food restaurants, such devices typically employ a built-in memory device such as an EPROM. These memory devices contain preprogrammed menu information, pre-set cook cycle controls for the individual memory items, and the individual cooking parameters such as instrument position, temperature, and duration needed to accomplish the cook cycle. The present invention provides an improved controller that incorporates an instant-on feature, allowing the cooking surface or medium to be brought to the necessary temperature in sufficient time, after the device has been idling. The controller also modifies the cook cycle time to compensate for heat zone stratification caused in the cooking medium or surface due to extended idling.

The instant-on operation of the present invention comprises both a programmable instant-on enable and an instant-on time. The instant-on enable utilizes a microprocessor to look at the time from the last completed cook cycle and is typically programmable from 0 to 900 seconds (i.e., elapsed programmed time). The instant-on time provides initial heat to the appliance for a predetermined period of between 0 to 50 seconds (i.e., heat-up programmed time). If the time from the last completed cook cycle is less than the elapsed programmed time, then the microprocessor does not use the programmed instant-on time or the added initial cook time.

If, however, the time from the last completed cook cycle is greater than the elapsed programmed time, then the microprocessor will use the programmed instant-on time. If this is the first cook cycle, then the microprocessor will use the programmed initial cook time which is the set cook time plus programmed additional time from between about 0 to 20 seconds. If this is the second cook cycle and it is less time than instant-on enable elapsed programmed time, then the microprocessor will use the programmed second cook time which is the set cook time, plus programmed additional time from 0 to 10 seconds. If this is the third cook cycle and it is less time than instant-on enable elapsed programmed time, then the microprocessor will use the programmed third cook time which is the set cook time, plus programmed additional time from 0 to 10 seconds. If this is the fourth cook cycle and it is less time than instant-on enable elapsed programmed time, then the microprocessor will use the programmed set cook time. After the instant-on time is complete, the microprocessor looks at the temperature and (1) if it is under the predetermined set temperature, then the heat stays on; and (2) if it is over the predetermined set temperature, then the heat turns off.

Figure 1:
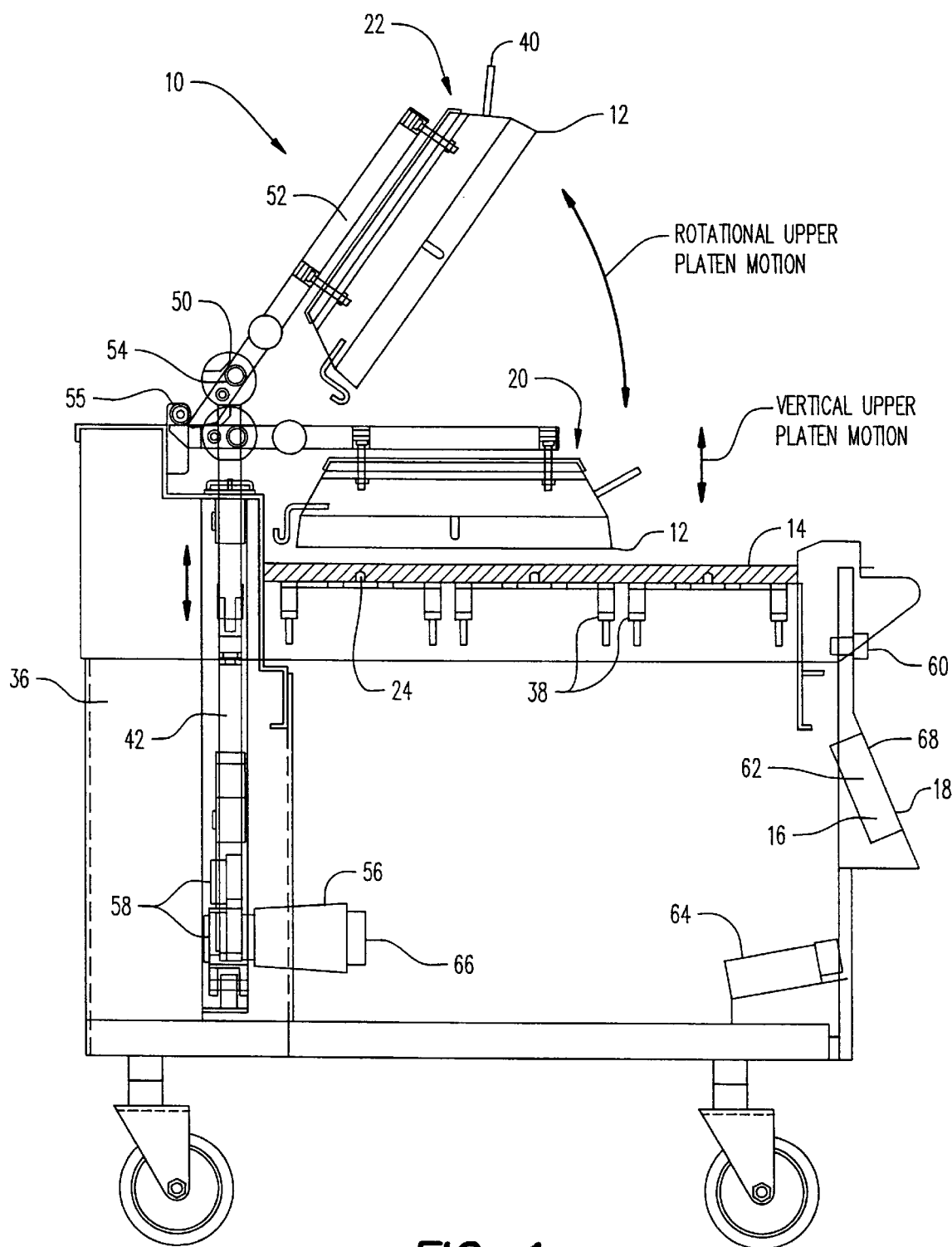
FIG. 1 is a side elevation view of a cooking apparatus grill employing a preferred embodiment controller of the present invention, depicting the motion of the upper platen from raised to lowered position.
Figure 2:
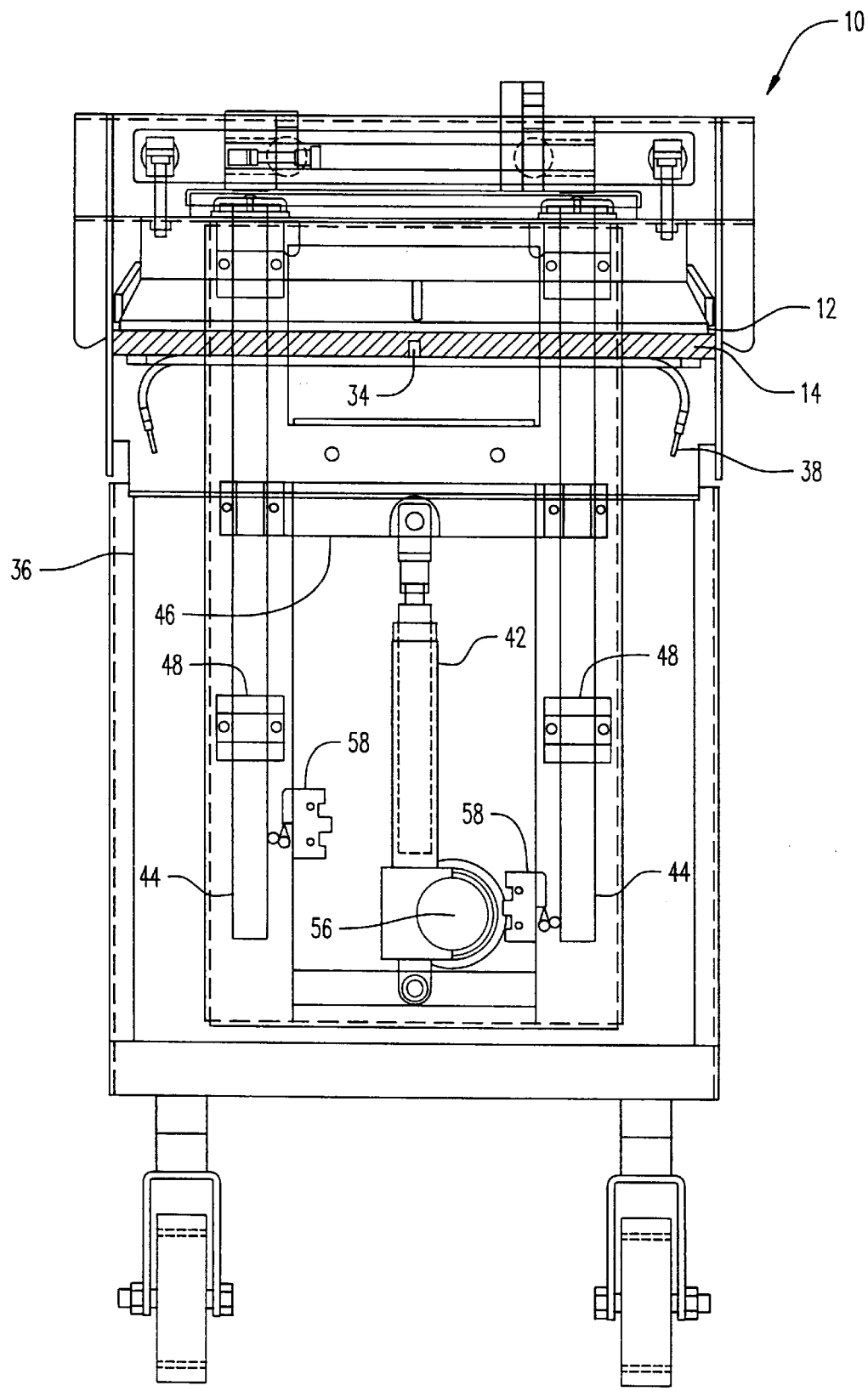
FIG. 2 is a rear schematic view of the cooking apparatus shown in FIG. 1.
Figure 3:
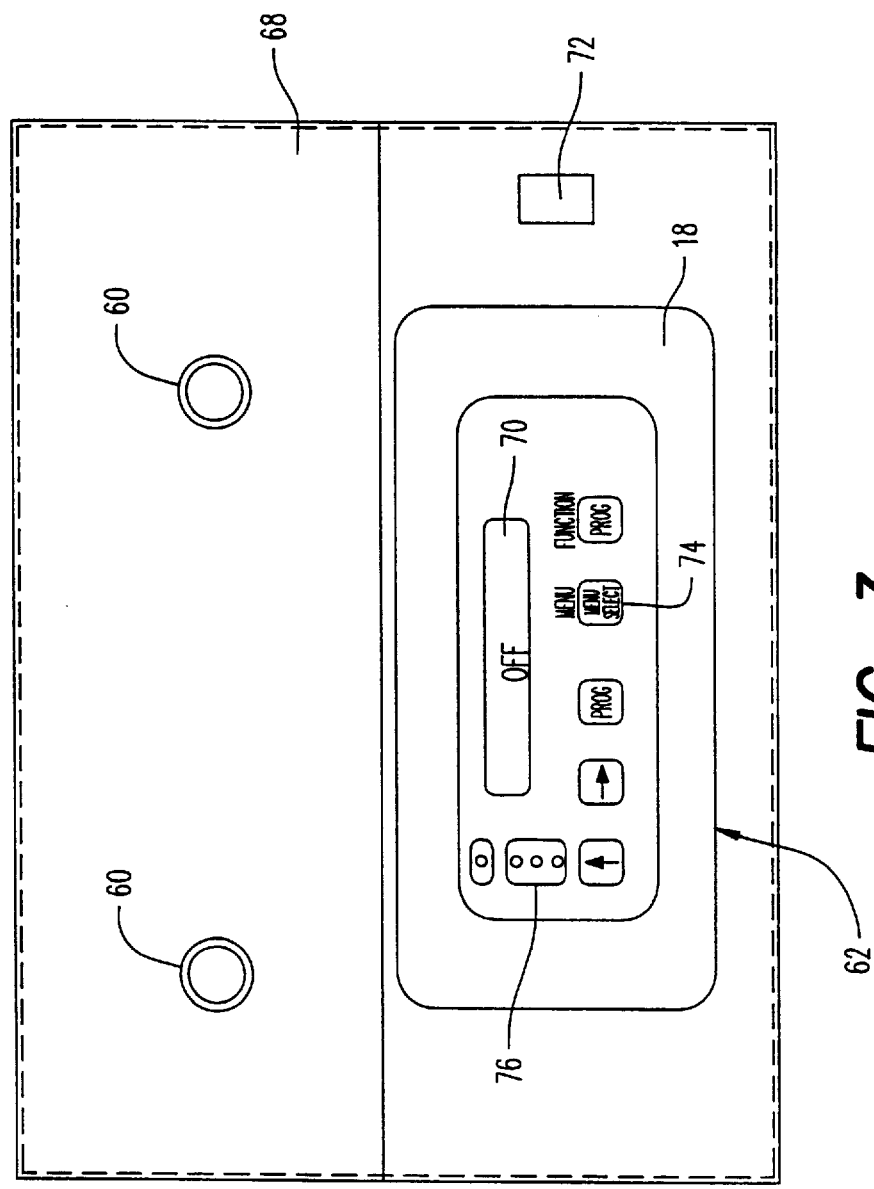
FIG. 3 is a front view of the activation switches and user interface controls of the apparatus of FIGS. 1 and 2.
Figure 3:
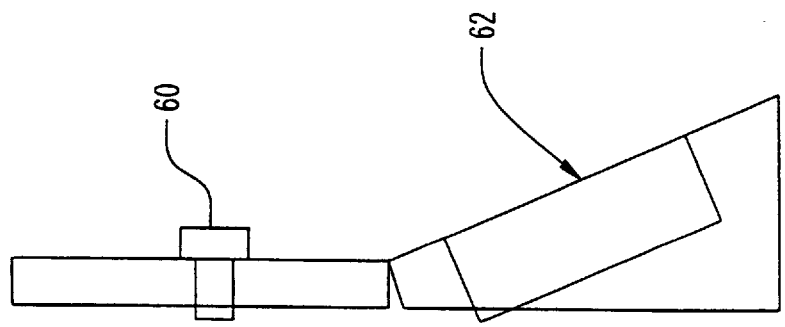

A preferred embodiment according to the present invention is depicted in FIGS. 1 through 4. FIGS. 1 and 2 depict clam shell grill 10 having upper platen (or cooking surface) 12 and lower platen 14. Food items are placed on lower platen 14, and upper platen 12 is subsequently lowered, manually or automatically, to contact and cook the food items. The instant-on feature of the present invention can be invoked in a variety of ways. Instant-on enabler 16 can be activated when a key on keypad 18 (as shown in FIG. 3) of clam shell grill 10 is activated by the operator. Instant-on enabler 16 can alternatively be activated when the activation buttons are pressed to initiate the cooking cycle. Sensors 24 in the cooking surface can also activate instant-on enabler 16 when the first food item is loaded.

Figure 4:
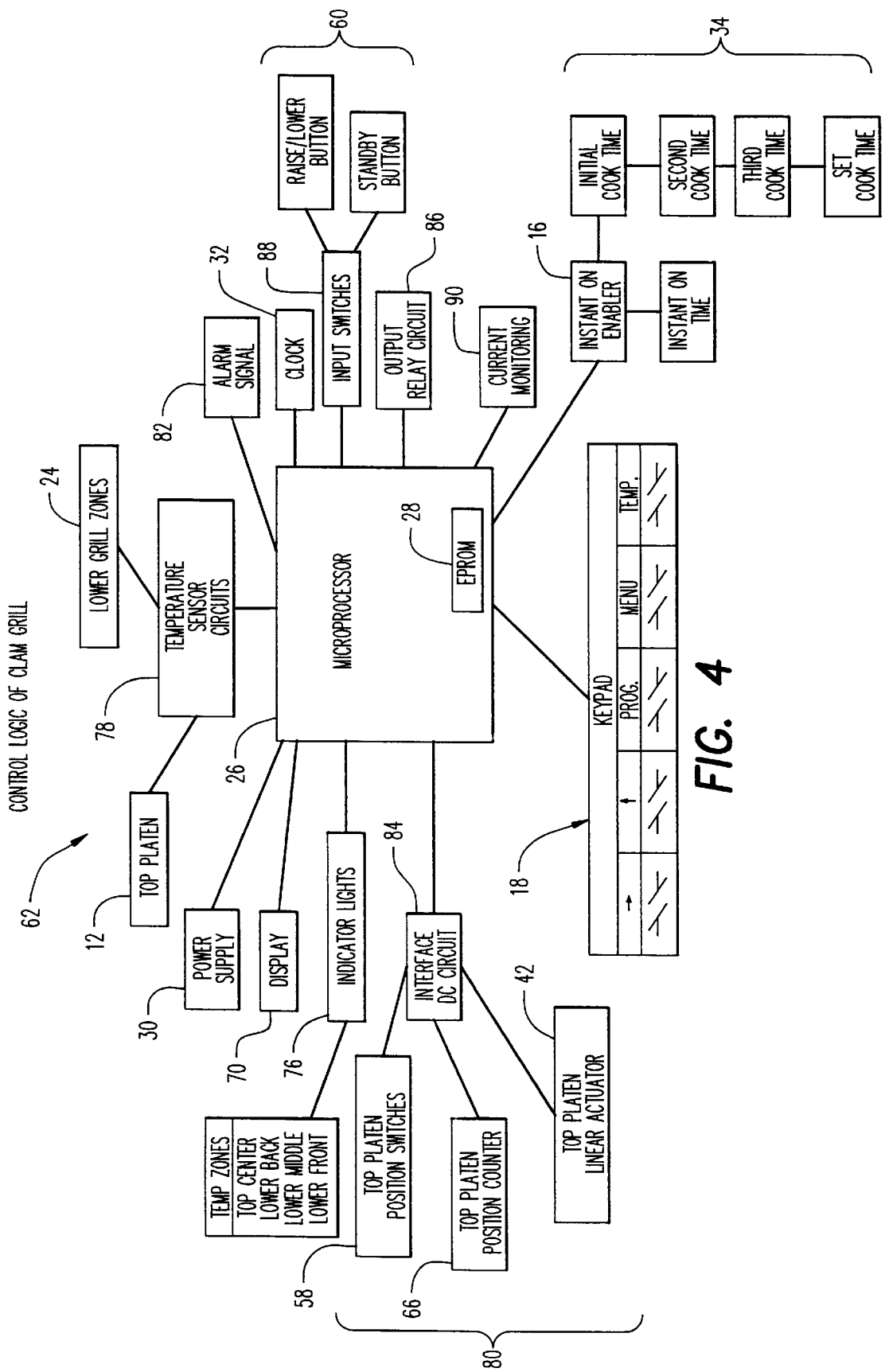
FIG. 4 is a block diagram depicting the control logic of the cooking apparatus of FIGS. 1–3.

FIG. 4 depicts the control logic of clam shell grill 10 of FIGS. 1 and 2. A central microprocessor 26 is incorporated into clam shell grill 10, having an embedded EPROM 28 containing the pre-set menu item cook cycle information. EPROM 28 is removable and replaceable to allow new menu items and new cooking protocols to be accommodated easily. Power supply 30 powers microprocessor 26, which powers a variety of operation, display and safety circuits and switches. Instant-on enabler 16 is controlled by microprocessor 26. When activated, instant-on enabler 16 sends a signal to microprocessor 26. Microprocessor 26 checks clock 32 to determine the amount of time it has remained idle since the last cook cycle. This information is sent back to instant-on enabler 16, which then selects among an appropriate array of cooking times 34. These times, longer than the initial pre-set cooking time, are based on testing and compensate for the degree of heat zone stratification caused by the extended idling. For example, an initial cook time may be 90 seconds. If the device has been idling for 10 minutes, instant-on enabler 16 can be programmed to initiate a 110 second cook cycle, to produce properly cooked food items. If the device has been idling for 30 minutes, the instant-on enabler will initiate a 120 second cook cycle, for example.

An additional feature of instant-on enabler 16 is that it immediately supplies additional heat to the cooking surface upon activation by activation buttons or operator input. This allows the maximum time for the cooking surface to reach proper cooking temperature before the cook cycle is initiated, thus minimizing cook cycle time. In a flat grill, the instant-on feature is activated the same way as in the clam grill or a cooking cycle on a fryer. In contrast, traditional controllers adjust cooking surface temperature only after the food items have been loaded.

Most preferably, the foregoing controller is employed in the unique clam shell grill shown in FIGS. 1 and 2 to provide optimal cooked product. Traditional single surface grills are widely used in most restaurants for cooking a wide variety of food products. Many fast food restaurant menu items require cooking on both sides, and such restaurants have found it advantageous to cook both sides at the same time to expedite the cooking time. With a single surface grill it is necessary for the operator to turn, for example, hamburger patties over after they have been cooked on one side for cooking on the second side. This increases the amount of operator attention required for cooking these food products and also increases the cooking time.

Two-sided grills have been made with upper and lower cooking platens for cooking food products such as hamburger patties. Two-sided cooking grills reduce the overall cooking time and the amount of operator attention required for cooking the hamburger patties. However, there are a number of interrelated shortcomings in the two-sided cooking grills currently in use.

The upper cooking platen in two-sided grills used by commercial food service establishments are generally large enough to enable the operator to cook a number of individual hamburger patties or other items at the same time. The patties are pre-formed in several different nominal sizes and thicknesses and are commonly frozen for storage and transportation. The frozen patties are relatively rigid when initially placed on the lower cooking platen and if the upper platen rests only on the thickest patty or patties, even small differences in the thickness of the patties in the group being cooked can prevent or delay proper heat transmission from the upper platen to some of the thinner patties. This can result in uneven cooking of the patties. On the other hand, the patties typically soften and shrink or decrease in thickness as they thaw and cook. The weight of the upper cooking platen at this stage of the process can excessively compress the hamburger patties which can adversely affect the texture and appearance of the cooked patties.

Thus, two-sided grills present several special problems including: accommodating variations in initial thickness of the individual patties in the group being cooked; accommodating the decrease in thickness of the patties that occurs during cooking; preventing excessive compaction of the patties; and accommodating different groups of patties of nominally different thicknesses. In addition, in two-sided grills, there is the problem of moving the upper platen at the beginning and end of the cooking cycle. In order to facilitate timed cooking, the two-sided grill is desirably arranged to raise the upper platen at the end of a cooking cycle to stop cooking by the upper platen and enable removal of the cooked products from the lower platen.

Various two-sided grills have been made in which the upper cooking platen is mounted on a support arm for swinging movement about a horizontal axis between the lower cooking position and a raised position. On various two-sided grills the upper platen is counter-balanced with a gas spring to assist in the manual lifting of the platen at the completion of a timed cooking cycle. This greatly limits the amount of pressure that can be applied by the upper platen to the frozen patties when initially placed in the cooking position. Heat will not be quickly transmitted to the patties, and consequently, the patties will not achieve the desired amount of carmelization.

Other two-sided grills utilize an upper platen counterbalanced with heavy weights to automatically raise the platen and keep it in a raised position. These grills use electromechanical, pneumatic or hydraulic mechanisms to hold the platen in the cooking position and mechanical stops to regulate the spacing between the upper platen and the lower platen cooking surface. Some grills use multiple pins adjustably mounted throughout the cooking surface of the upper platen for engagement with the upper face of the lower platen as mechanical stops. These stop pins, however, limit the usable cooking area on the upper and lower platens and make it difficult to clean the upper platen. Grease and other debris generated by the cooking process tend to bake on the pins and impede their adjustment. Other grills use external cams mounted on shafts extending horizontally through the platen cover as mechanical stops. These are also difficult to clean and over time generate wear on the lower platen surface.

Still other arrangements include stop pins disposed inside the platen cover with the platen hanging or floating from the upper surfaces of these pins. The adjustment for the various product thickness settings is done by rotating a series of handles that protrude through the upper surface of the platen cover. Once again, the grease and other debris normally created by cooking hamburgers and other foods migrate down the handles, bake on the stop pins and impede their adjustment. In addition, the carbonized matter on the pins and hanging mechanism alters the distance between the platens, requiring regular realignment.

In each of these instances, the mechanical stops that regulate the spacing of the platens for the various products require that the stops be adjusted manually with each different product that is cooked. Even with such mechanical stops, when the food items are of even nominally different thicknesses, the upper platen will contact the thickest patty first. Only after the thickest patty has begun to shrink as it cooks will the platen contact the thinner patties. Because the mechanical stops are typically set for the finished product thickness, these stops will only be reached once the final, thinnest patties are contacted by the upper platen and cooked. Thus, such an arrangement provides very uneven cooking of the patties. This limitation can also be observed when individual patties have varying thicknesses across their surfaces. High spots will be overcooked or even burned, while portions having a lower profile will be undercooked. Individual patties, then, can have both burned and raw portions, providing an unacceptable product.

The preferred embodiment of FIGS. 1 and 2 overcomes these limitations by providing precise, controlled, two-sided cooking by means of an apparatus having a floating upper platen construction which allows for complete control of the degree of pressure the upper platen places on the food. It also overcomes these limitations by providing microprocessor control of both the upper platen operation and the entire cooking cycle. The upper platen is positioned substantially parallel to the patties and the lower platen prior to coming into contact with the patties. This optimizes cooked product quality and uniformity and minimizes operator involvement.

This embodiment provides precise, controlled, two-sided cooking by means of an apparatus having a floating upper platen construction which allows for complete control of the degree of pressure the upper platen places on the food. This floating upper platen construction also permits the pressure to be varied through the cooking process, allowing, for example, significant pressure during the first stage of cooking to provide proper searing and carmelization, and lighter pressure as cooking progresses, preventing overcompression, burning, boiling and other undesirable effects.

The present embodiment achieves this floating construction with a positioning mechanism which controls the upper platen's movement in both an arcing, clam-shell fashion, in which the front edge of the upper platen swings from its raised, open position to a lower, closed position, and a second, vertical fashion, in which the upper platen, now parallel to the lower platen, moves vertically downward to contact the food. Vertical movement is also possible during the cooking cycle, allowing for adjustment of the upper platen as the food shrinks during cooking.

The present embodiment also provides greater consistency in the cooking process and decreases the time the operator must spend initiating and monitoring the cooking process. This grill thus uses a programmable computing device to control the motion of a motorized upper platen positioning assembly. This allows the current invention to omit mechanically set physical stops which control the gap between cooking surfaces, and hence to avoid all the problems and limitations inherent in such constructions (e.g., labor intensive to operate, hard to clean, limited gradations available to adjust the gap between platens, increased wear on the surfaces and greater maintenance required). It provides many other advantages as well, including providing for a variety of stored data regarding optimal pressure and timing during cooking for a variety of food products and dimensions. In addition, increased automation of the cooking process decreases the possibility of operator error.

The present embodiment also provides for enhanced ease of use and cleaning. The dual vertical and arcing movement also allows for the upper platen's lowest edge to be further from the lower platen when in the open position. This allows for greater access to the lower cooking platen for easier cleaning and easier loading and removal of food. In addition, this permits the device to be used in a "flat" mode for items which are not suited to two-sided cooking. In such an application, the upper platen will remain unheated in its uppermost open position, and the lower platen can be used as a conventional flat cooking surface.

The present embodiment also enhances the safety of operation of two-surface cooking devices. In this device, two switches must be activated simultaneously to initiate upper platen movement and the cooking cycle, thus increasing the safety of operation and minimizing the risk that an operator could inadvertently activate the positioning mechanism and cause injury.

The preferred configuration of the two-surfaced cooking apparatus, as shown in FIGS. 1 and 2, comprises a support structure 36 to which lower cooking platen 14 is horizontally mounted. This lower platen has a smooth level cooking surface on its upper side. This lower platen 14 is heated to cooking temperature by gas or electric means via heating elements 38 or equivalent gas burners. In this embodiment, lower platen 14 is of substantial dimension, for example two feet by three feet, to accommodate large numbers of food items at once.

An upper platen assembly is movably mounted to the rear of support structure 36 by means of a positioning mechanism. The upper platen assembly comprises an upper cooking platen 12 heated to cooking temperature by heating elements mounted within a casing. Upper cooking platen 12 is either smaller than or equivalently sized to lower cooking platen 14. Upper platen 12 has a handle 40 mounted on its front side for manual manipulation of the upper platen assembly. In an alternate preferred embodiment, two separate upper platen assemblies are mounted over a single lower platen, allowing for greater flexibility for the cook/operator.

The positioning mechanism facilitates two distinct motions by upper platen 12 from its uppermost position to a cooking position. In this embodiment, linear actuator 42 is liked to two vertical reciprocating shafts 44 by actuator cross bar linkage 46. Actuator cross bar linkage 46 is clamped to vertical reciprocating shafts 44 which run through linear motion bearings 48. These vertical shafts 44 are affixed to arm pivot/stop heads 50. Cantilever bars 52 run through arm pivot/stop heads 50 through rotational pivot bearings 54. When upper platen 12 is in its uppermost rotational position 22 (see FIG. 1), linear actuator 42 is extended to its maximum position, vertical reciprocating shafts 44 and arm pivot/stop heads 50 are extended upward and to a position which forces the back end of cantilever bars 52 to contact rotational bearing 55 forcing rotational motion of upper platen 12 to an angle of approximately 54° from the horizontal. When linear actuator motion is reversed, upper platen 12 descends both vertically and through an arc caused by the cantilever weight of upper platen 12 maintaining contact between rotational bearing 55 and back of cantilever bars 52. When cantilever bars 52 and upper platen 12 become parallel with lower platen 14, the stop portion of arm pivot/stop head 50 stops the rotational motion of cantilever bars 52 causing purely vertical motion of upper platen 12 from this point and further down to any of the cooking positions.

The linear actuator assembly comprises a drive motor 56, linear actuator 42, two substantially vertical reciprocating shafts 44 and position sensor switches 58. Linear actuator 42, when activated, moves upper platen 12 vertically while the cantilever weight of upper platen 12 maintains contact between arm pivot/stop head 50 until the back of cantilever bar 52 makes contact with rotational bearing 55. This movement ensures that upper platen 12 is constantly parallel to lower platen 14 during this stage of upper platen travel. Once cantilever bar 52 makes contact with rotational bearing 55 the vertical motion is changed to rotational motion to a point where upper platen 12 is raised to the point at which upper position sensor switch 58 is set (approximately 54° above horizontal). An audible signal is sounded five seconds prior to the start of upward platen movement to alert the operator of impending upper platen movement. When activation buttons 60 (see FIGS. 1 and 3) are depressed simultaneously to start a cooking cycle user interface controller 62 (refer to FIG. 4) sends information to motor position controller 64. This information is used by motor position controller 64 to activate linear drive motor 56. The action of the rotational motion of linear drive motor 56 causes electrical pulses to be generated by positioning pulse encoder 66. The pulses generated by positioning pulse generator 66 are received by motor position controller 64. This information and the activation of lower position sensor switch 58 allows motor controller 64 to accurately position the entire drive system to a predetermined upper platen position for cooking.

The computer control is, in this embodiment, mounted behind an access plate contained in a simple user-friendly interface 68 located on the front display of the grill. This interface comprises a control panel including an alpha-numeric digital display panel 70, input switches 72 and buttons 74 and LED indicator lights 76 (see FIGS. 3 and 4). The two activation buttons 60 must be pressed simultaneously by the operator to start the movement of upper platen 12 into cooking position. The interface 68 is sealed behind a polyester cover for protection. Data is accepted by the computing device, typically a microprocessor 26 and additionally, in this embodiment, EPROM 28 pre-programmed with relevant operating or cooking parameters, from interface 68, temperature circuit 78, position indicators 80, and timer circuitry or clock 32. EPROM 28 is capable of storing a variety of programs, including: menu items, whether individual foods are active or inactive menu items, cooking functions, temperature settings, gap settings, cooking times, and end of cook cycle protocols. In addition, EPROM 28 stores the various cook times needed to facilitate the instant-on enabler 16 of the present invention. EPROM 28 is easily accessible behind its panel on the control board. This allows for easy substitution in the case of a defect or a change in desired programming.

To illustrate, a typical cooking cycle will be outlined. The grill apparatus begins in an inactive state, with its upper platen 12 in its fully open and raised position. The upper platen 12 is at an angle of 54° from horizontal. The operator will select the relevant product setting, e.g., quarter-pound hamburgers, from the menu on interface 68, then will load the frozen hamburger patties a single layer thick across the surface area of lower platen 14 which will be covered by upper platen 12 when it is lowered. This area may be marked on lower platen 14 for easy reference. When loading is complete, the operator will simultaneously depress the "raise platen" and "standby" buttons 60, which are physically offset from one another, to initiate the cook cycle.

At this point several things occur. The temperature sensing thermocouple probes (not shown) located in the lower and upper platens (14, 12) will be sending data to microprocessor 26 and sensing the temperature of the platens. Microprocessor 26 will activate heating elements 38 in upper and lower platens (14, 12) when appropriate. At the same time, upper platen 12 will begin its two-phase descent into cooking position. Microprocessor 26 will receive data from positioning pulse encoder 66 and lower sensor switch 58 indicating the relative height of vertical reciprocating shafts 44. The positioning pulse encoder 66 will also provide continuous data on the offset distance between the two positioning switch 58 sites. The pulses received by positioning pulse encoder 66 are monitored and must remain constant for upper platen 12 to remain in proper horizontal level. Positioning pulse encoder 66 and lower sensor switch 58 will indicate that upper platen 12 is in its most open, uppermost position. Microprocessor 26 will then activate actuator drive motor 56 which drives linear actuator 42 to begin to lower pivot/stop head 50. This motion (combined with the cantilevered weight of upper platen 12) will cause the ends of cantilever bars 52, which are in direct contact with rotational bearings 55, to begin to rotate downward and in a clockwise fashion (when viewed from the side view of FIG. 1) around rotational bearings 55. This, in turn, will cause upper platen 12 to begin to tilt downwards towards horizontal alignment with lower platen 14. In this motion, cantilever bars 52 pivot rotational bearing 55 and the back of cantilever bars 52 roll along the rotational bearing through approximately a 54° arc, and the front edge of upper platen 12 will descend, describing the same 54° arc. The microprocessor will control drive motor 56 throughout this movement so that upper platen 12 is lowered slowly and evenly to minimize any possible safety risks.

The cantilever bars 52 will continue rotating clockwise around rotational bearings 55 until the rear end of the bars engage the stop portion of arm pivot/stop heads 50. This halts the rotational movement of cantilever bars 52 and of upper platen 12. At this point, linear drive motor 56 will continue to lower arm pivot/stop head 50. Because the ends of cantilever bars 52 can no longer rotate due to contact with the stop portion of arm pivot/stop heads 50 there is no more rotation of cantilever bars 52 and upper platen 12 for the remainder of vertical movement imparted by linear drive motor 56 into the system. Thus all motion will now be non-rotational.

The upper platen 12 is now parallel to and suspended above lower platen 14 and hamburger patties. As linear actuator 42, driven by linear drive motor 56, and controlled by motor positioning controller 64, continues to lower arm pivot/stop head 50 and cantilever bars 52, upper platen 12 descends to a predetermined position above lower platen 14. This position was programmed into user interface control 62 for the specific product to be cooked. The positioning pulse encoder 66 will be sending calibrated height data to microprocessor 26. Any inconsistent data will trigger an error or servicing message on display 70, and an audible alarm 82. The height data will pinpoint the height of upper platen 12 above lower platen 14, and above the particular food item to be cooked.

Microprocessor 26 will stop linear drive motor 56 at the exact point set forth in its programming for the beginning of the cook cycle. This height measurement is derived from prior testing data on standardized menu items to provide optimal cooking contact and pressure. The microprocessor is capable of controlling the gap setting to a very precise degree, down to (+/−) 0.0015 inch gradations.

The cooking cycle can be canceled by depressing raise/lower button 60. This allows the operator to change menu selections or other operating parameters.

Microprocessor 26 will sound an audible signal five seconds prior to the conclusion of the cooking timing sequence to alert the operator that the cooking process has been completed and to be ready to begin the process of removing the finished food product. When microprocessor 26 determines that the pre-set cooking cycle is complete, it automatically restarts the drive motor 56 in the opposite direction causing linear actuator 42 to exert upward force on arm pivot/stop head 50, cantilever bars 52, and upper platen 12. The upward thrust of linear actuator 42 causes arm pivot/stop head 50 and connected upper platen 12 to begin to move upward. The upper platen 12 remains parallel to lower platen 14 and the cooked food products as it lifts away from them. Then, when the ends of cantilever bars 52 again engage rotational bearings 55 the vertical force of linear actuator 42 causes cantilever bars 52 to rotate about rotational pivot bearing 54 in arm pivot/stop head 50 converting the purely vertical motion of upper platen 14 to both vertical and rotational motion, with the ends of bars 52 rotating counterclockwise (as viewed in FIG. 1) about rotational bearings 55 and the front end of upper platen 14 arcing upward until the maximum angle is achieved (approximately 54°). At that point microprocessor 26 halts drive motor 56 and effectively locks upper platen 14 into place.

For optimal cooking results, microprocessor 26 can be programmed to follow the following steps: precisely apply pressure to the food item to sear the underside of the food; raise the upper platen 12 to release any trapped steam from the food; and precisely lower upper platen 12 again to apply pressure to the food and sear the upper surface of the food. This pressure is then precisely controlled through the remainder of the cooking process. This improved process can create a finished food product having improved appearance and taste, as compared to food produced by a conventional two-sided cooking process.

The uppermost position of upper platen 12 provides clear access to the cooked product for easy removal and for cleaning of the upper and lower platen surfaces. If upper platen 12 moved only horizontally, even in a raised position it would be difficult to see and access food items toward the rear of lower platen 14. If upper platen 12 only rotated about fixed points of attachment on its rear edge, the forward edge of upper platen 12 would potentially remain in a dangerous position. An operator unloading food at the rear of lower platen 14 would run a greater risk of hitting or burning his head on the forward edge. In addition, the rear edge of upper platen 12 would be substantially closer to lower platen 14 reducing the clearance for utensils and hands, increasing the possibility of bum injury from accidental contact with the upper platen cooking surface.

Once again, throughout this two-phase upward motion, microprocessor 26 is receiving and monitoring data inputs from positioning pulse encoder 66 and position sensor switches 58 on vertical reciprocating shafts 44. The offset distance between the two positioning sensor switches 58 must remain constant to keep upper platen 12 in the proper position relative to lower platen 14. The distance traveled by vertical reciprocating shafts 44 tells microprocessor 26 the upper platen's relative location in its traverse. It can be appreciated that the center and rear edge of upper platen 12 also move through the same 54° arc that the front edge travels during the rotational movement. The chords of those arcs are respectively shorter, however, in proportion with their distance from the rotational bearings 55.

After the cooked food has been unloaded from lower platen 14, the grill may be left in idling mode for varying periods of time. It is at this point that the instant-on enabler 16 discussed above comes into play. As described above, instant-on enabler 16 can be activated when a key on keypad 18 (as shown in FIG. 3) of clam shell grill 10 is activated by the operator. Instant-on enabler 16 can alternatively be activated when the activation buttons are pressed to initiate the cooking cycle. Sensors 24 in the cooking surface can also activate instant-on enabler 16 when the first food item is loaded.

Instant-on enabler 16 is controlled by microprocessor 26. When activated, instant-on enabler 16 sends a signal to microprocessor 26. Microprocessor 26 checks clock 32 to determine the amount of time it has remained idle since the last cook cycle. This information is sent back to instant-on enabler 16, which then selects among an appropriate array of cooking times 34. These times, longer than the initial pre-set cooking time, are based on testing and compensate for the degree of heat zone stratification caused by the extended idling. For example, an initial cook time may be 90 seconds. If the device has been idling for 10 minutes, instant-on enabler 16 can be programmed to initiate a 110 second cook cycle, to produce properly cooked food items. If the device has been idling for 30 minutes, the instant-on enabler will initiate a 120 second cook cycle, for example. An additional feature of instant-on enabler 16 is that it immediately supplies additional heat to the cooking surface upon activation by platen movement or operator input.

In addition, the upper platen drive system of the preferred embodiment of FIGS. 2 and 3 has a safety system built into microprocessor 26 which monitors the amperage of the motor of upper platen 12 when in motion. If microprocessor 26 receives information from linear actuator 42 that is outside the window of acceptable amperage, microprocessor 26 determines that there is some problem causing impairment of motion. If upper platen 12 was descending, microprocessor 26 will stop linear drive motor 56 and output an alarm sound 82 and display an error message on user interface control display 70. If upper platen 12 is in an upward motion when an obstruction is encountered, the microprocessor will reverse the motion of upper platen 12 and move it to a position approximately one inch above lower platen 14 and again output an alarm sound 82 and display an error message on the user interface control display 70. After either of the above events occur, the power to the controls must be reset in order for automatic motion of upper platen 12 to be reinitiated.

The logic diagram (FIG. 4) shows the attributes of user interface control 62. Power to microprocessor 26 is supplied through power supply 30, which, when initiated, will start a check system of microprocessor 26. This diagnostic system check powers D.C. interface 84 and feeds back the cooking surface conditions. Temperature circuit 78 will report temperatures of the upper and lower platens (14, 12) to microprocessor 26, and the results will be available for review at display 70. During this diagnostic check, conditions of circuit 78 are verified and reported to the processor.

Display 70 will show "OFF" once the diagnostic has completed its check. When an operator depresses activation buttons 60, Menu Select button 74 activates microprocessor 26 to a pre-set or programmed condition of cook-time, cooking temperature, and platen position, which will activate output relays 86 as required to achieve the desired temperature. If a problem is detected, alarm signal 82, along with display 70, would indicate the error. The EPROM 28 contains a number of ERROR messages stored in memory. Such error messages include "Probe Open," "Faulty Platen Latch," "Upper Platen Locked," "EPROM Corrupt," "Faulty Element," and "Shortened Probe."

Activation of input switch circuit 88 will initiate a cook cycle. Both the raise/lower and standby switches 60 require contact closure or depression to start timer clock 32. The system will accept the start only if the menu item or program selected is within the operating temperature range for the predetermined cook cycle. A visual inspection of indicator lights 76 will show heat zone conditions. The "too cool" amber LED indicates heating is in process. The "too hot" red LED is an indication of an excessive temperature condition and the green LED represents the "ready" condition for the selected food product. Display 70 will further describe the griddle's condition with a character message. A flashing message represents a change required to meet the selected program prior to starting the cycle. The steady non-flashing message is the ready condition. Once the program has been initiated, top platen 12 will be lowered by actuator 14. During any of the operations of the grill, current monitoring and/or clutch 90 is available to stop the cycle. When activated, current monitoring 90 will interrupt power supply from D.C. interface 44, shutting off the entire grill and canceling all modes. This will also position upper platen 12 to a neutral location which is midway above lower platen 14, allowing access above and below the grill. By depressing and holding raise/lower switch 60 for three seconds, an operator can cancel a program in progress and raise upper platen 12 to a fully-open position. This cancellation will not turn off microprocessor 26, but will return to the previous menu select position.

Microprocessor 26 has a large memory which enables numerous programs to be stored in EPROM 28. The following are conditions that an operator has the ability to pre-set:

Menu Item: Alpha-numeric character display describing the menu item.

Operate Mode: A choice of an active or a non-active menu item. The cooking conditions are stored in memory when in a non-active mode.

Function (Duty): Alpha character display of a prompt such as Turn, Remove, etc.

Temperatures: Setting of temperature for upper and lower platens (14, 12).

Gap Setting: Numeric setting (in thousandths of an inch) of position between upper and lower platens (14, 12).

Time: Numeric value (in seconds) for duration of platen down, at gap setting.

Cancellation Method: Selection of how the upper platen will operate at end of timing and how the audible signal will cancel.

Microprocessor 26 uses EPROM 28 which enables a chip to be factory programmed with menu items predetermined and loaded into the controller's operating memory quickly. Exchange of EPROM 28 will allow for complete menu changes reducing the on-side programming required. Each EPROM's programs can be altered through a program access to re-program the menu items. A key programmable item which offers market advantage is the precise gap setting to (+/−) 0.0015 inches.

The invention having been thus described with particular reference to the preferred forms thereof, it will be obvious that various changes and modifications may be made therein without departing from the spirit and scope of the invention as defined in the appended claims.

What is claimed is:

1. A cooking device comprising:

a cooking medium;

heating means for heating said cooking medium;

a microprocessor for controlling said heating means; and an instant-on enabler;

wherein said instant-on enabler conveys a signal to said microprocessor when said instant-on enabler is activated, and said microprocessor determines an idling time since a previous cooking cycle was completed and selects an appropriate cooking time based on said idling time, to compensate for heat zone stratification of said cooking medium during said idling time.

2. The cooking device of claim 1, wherein said microprocessor further causes said heating means to heat said cooking medium immediately upon receipt of said signal.

3. The cooking device of claim 1, wherein sensor means is provided for activating said instant-on enabler when a food product is first placed in contact with said cooking medium.

4. The cooking device of claim 1, wherein if said idling time is less that a preset limit, a final cooking time will be selected by said microprocessor based on the number of cook cycles that have elapsed since said instant enabler was last activated when said idling time exceeded said preset limit.

5. The cooking device of claim 4, wherein if less than said number of cook cycles have elapsed since said instant enabler was last activated when said idling time exceeded said preset limit, said microprocessor will add a programmed additional time to a base cooking time to derive said final cooking time, and if said number or more cook cycles have elapsed since said instant enabler was last activated when said idling time exceeded said preset limit, said microprocessor will use said base cooking time as said final cooking time.

6. The cooking device of claim 1, wherein said cooking device is a clam shell grill, and said cooking medium includes an upper platen and a lower platen.

7. The cooking device of claim 1, wherein said microprocessor includes an EPROM.

8. The cooking device of claim 1, wherein said instant-on enabler is embedded in said microprocessor.

9. The cooking device of claim 1, wherein said instant-on enabler is activated by means of a key disposed on said cooking device.

10. The cooking device of claim 6, further comprising:
positioning means for disposing said upper platen above said lower platen, said positioning means including a hinge and a linear actuator,
wherein said positioning means enables a first stage arcing movement of said upper platen about said hinge toward said lower cooking platen, and a second stage vertical movement of said upper platen in tandem with said linear actuator, thus allowing complete control of the degree of pressure said upper platen places on a food product resting on said lower platen.

11. The cooking device of claim 10, wherein said positioning means is capable of positioning said upper platen to a set height above said lower platen to within (+/−) 0.0015 inches.

12. The cooking device of claim 10, wherein said microprocessor is further programmed to:
lower said upper platen to apply pressure to a food product to sear one side of the food product;
raise said upper platen to release trapped steam from the food product;
lower said upper platen to apply pressure to the food product to sear another side of the food product; and
control pressure on the food product until the food product is cooked through.

13. The cooking device of claim 1, further comprising:
a housing;
a lower platen mounted to said housing;
a positioning mechanism mounted to said housing; and
an upper platen mounted to said positioning mechanism,
wherein said positioning mechanism includes a linear motion bearing mounted to said housing, a linear actuator running through said linear motion bearing, and an arm pivot/stop head affixed to said linear actuator, said upper platen being adjoined to said arm pivot/stop head to enable vertical and arcing movement of said upper platen.

14. The cooking device of claim 13, wherein when said upper platen is lowered from an uppermost rotational position to a cooking position, said upper platen rotates with said arm pivot/stop head until said upper platen reaches a position parallel with said lower platen, at which point said arm pivot/stop head stops rotation of said upper platen, and said upper platen moves purely vertically to said cooking position.

15. The cooking device of claim 1, wherein there is provided first and second physically offset activation switches; and
wherein simultaneous activation of said first and second switches activates said instant-on enabler.

16. The cooking device of claim 5, wherein said number is four.

17. The cooking device of claim 4, wherein said microprocessor further causes said heating means to heat said cooking medium immediately upon receipt of said signal.

18. The cooking device of claim 1, wherein if said idling time is less than a preset limit, a final cooking time will be selected by said microprocessor based on the elapsed time since said instant enabler was last activated when said idling time exceeded said preset limit.

19. The cooking device of claim 18 wherein sensor means is provided for activating said instant-on enabler when a food product is first placed in contact with said cooking medium; and
wherein said microprocessor further causes said heating means to heat said cooking medium in response to activation of said instant-on enabler by said sensor means.

* * * * *